(12) United States Patent
Pan

(10) Patent No.: US 8,934,924 B2
(45) Date of Patent: Jan. 13, 2015

(54) METHOD AND EQUIPMENT FOR PAGING IN TRUNKING SYSTEM

(75) Inventor: Yingxin Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1033 days.

(21) Appl. No.: 12/516,309

(22) PCT Filed: Nov. 19, 2007

(86) PCT No.: PCT/CN2007/071091
§ 371 (c)(1),
(2), (4) Date: May 26, 2009

(87) PCT Pub. No.: WO2008/061474
PCT Pub. Date: May 29, 2008

(65) Prior Publication Data
US 2010/0022258 A1    Jan. 28, 2010

(30) Foreign Application Priority Data
Nov. 24, 2006  (CN) .......................... 2006 1 0144067

(51) Int. Cl.
| | | |
|---|---|---|
| *H04W 68/00* | (2009.01) | |
| *H04W 68/08* | (2009.01) | |
| *H04W 68/02* | (2009.01) | |
| H04W 68/06 | (2009.01) | |
| H04W 68/04 | (2009.01) | |

(52) U.S. Cl.
CPC .............. *H04W 68/08* (2013.01); *H04W 68/06* (2013.01); *H04W 68/04* (2013.01); *H04W 68/02* (2013.01)
USPC ...................... 455/458; 455/456.1; 455/456.3

(58) Field of Classification Search
CPC ..... H04W 68/00; H04W 68/08; H04W 68/04; H04W 68/02; H04W 68/06
USPC ..................... 455/456.1, 458, 456.3
See application file for complete search history.

(56) References Cited

U.S. PATENT DOCUMENTS

| | | | | |
|---|---|---|---|---|
| 5,369,681 | A * | 11/1994 | Boudreau et al. | 455/456.1 |
| 5,490,203 | A * | 2/1996 | Jain et al. | 455/435.1 |
| 5,953,667 | A * | 9/1999 | Kauppi | 455/440 |
| 7,072,674 | B1 * | 7/2006 | Mademann | 455/458 |
| 2006/0189332 | A1 * | 8/2006 | Benco et al. | 455/458 |
| 2008/0096584 | A1 * | 4/2008 | Xu et al. | 455/458 |

FOREIGN PATENT DOCUMENTS

| | | |
|---|---|---|
| CN | 1592441 | 3/2005 |
| CN | 1926014 | 8/2006 |
| CN | 1859642 | 11/2006 |
| WO | WO 2005/069669 | 7/2005 |

OTHER PUBLICATIONS

Page, Telecommunication Dictionary, 1 page.*

* cited by examiner

*Primary Examiner* — Olumide T Ajibade Akonai
(74) *Attorney, Agent, or Firm* — Morgan, Lewis & Bockius LLP

(57) ABSTRACT

The present invention discloses a method for paging in a trunking system comprising: initiating a request for establishing a call by a calling user equipment UE, lookuping a location area of the called UE, paging the called UE in the location area and a location area adjacent to the location area. The present invention also discloses a paging equipment in a trunking system.

8 Claims, 6 Drawing Sheets

METHOD AND EQUIPMENT FOR PAGING IN TRUNKING SYSTEM

This application claims priority to and benefit of Chinese Patent Application Serial No. 200610144067.8, titled "method and equipment for paging in trunking system" and filed to the State Intellectual Property Office of P.R. China on Nov. 24, 2006, the invention of which is incorporated by reference herein in its entirety.

TECHNICAL FIELD

The present invention relates to communication technology of trunking system, more particularly, to a method and device for paging in a trunking system.

BACKGROUND

A trunking system is an advanced mobile communication dispatch system. The so-called trunking system means that available channels owned by the system can be shared by all users of the system and it has automatic channel selecting function. And the trunking system is a widely used wireless delegation communication system with high efficiency and low cost for sharing resources, burdening costs and sharing channel equipments and services. The trunking system has a high requirement on rapid call establishing. In addition, because of the specialty of the client groups, the requirement of call-through rate is high.

The trunking systems are mostly calling system which is centrally controlled through known PMN public mobile network, such as GSM network, with incorporated dispatching sub-systems.

Presently, a novel distributed trunking system is proposed which does not pass through public mobile network and has an independent calling system. The structure of the system is shown in FIG. 1, comprising trunking radio nodes (TRN) 10, a trunking dispatching center (TDC) 20, a trunking location register (TLR) 30, an application service (AS) 40 and a dispatching console 50. It further comprises a voice gateway (VGW) 60, a data gateway (DGW) 70 and a trunking interworking node (TIN) 80.

The user equipment (UE) 90 accesses the network by air interfaces of the TRN 10. And the UE 90 accessed into the TRN 10 is performed with mobile management and calling control by the TRN 10. The related information of the UE 90 accessed into the TRN 10 is notified to TDC 20, TLR 30 and other TRN 10, other UE 90 information sent by other TRN 10 is obtained and saved by the TRN 10. TDC 20 performs dispatch control to the UE 90s based on the dispatching of the dispatching console through the TRN 10, TLR 30 in the network. TLR 30 stores the related information of UE 90 for providing information to TRN 10 and assisting TRN 10 in the mobile management of the UEs. AS 40 manages the related information of UE 90s stored by the TLR 30. The dispatching console 50 is an equipment for performing dispatching control and service management of the UE 90s in the trunking communication network, mainly finishing the dispatching command of trunking call. VGW 60 achieves the interconnection and voice communication of the TRN 10, TDC 20, TLR 30 in the system with the PSTN public switched telephone network and/or PLMN public land mobile network 100. DGW 70 achieves the interconnection and data communication of the TRN 10, TDC 20, TLR 30 in the system with the external service network/data server 110. TIN 80 achieves trans-network communication between different trunking networks in the system.

In public mobile network, the network side initiates paging to an UE based on the location area/route area information of the called UE saved. However, under special circumstances, because the quality of the wireless network is inferior or the location area/route area where the UE is located changes whereas the UE does not report timely, thus the UE can not be paged at the network side.

Secondary paging solution is adopted in the public mobile network to avoid the occurrence of the above cases. The so-called secondary paging means: the network side initiates paging to the called UE in the location area/route area based on the saved location area/route area information of the called UE; if the called UE has moved into a new location area/route area without timely reporting the new location information to the network side, the called UE can not be paged in the original location area/route area by the network side. At this time, the network side automatically extends the paging range and secondarily pages the called UE at location areas/route areas adjacent to the original location area/route area, thus enhancing paging success rate and the call-through rate.

The problem of paging the trunking system user through the public mobile network lies in: if a primary paging is adopted, the paging range for the UE is limited, which only points to one location area/route area; if a secondary paging is adopted, the paging time delay is relatively long. In addition, whether a primary paging or a secondary paging is used, it can only be paged in the location areas/route areas managed by the same core network, which does not support trans-core network paging.

For the distributed trunking system, no specific paging method is proposed.

SUMMARY OF INVENTION

In viewing thereof, the technical problem to be solved by the present invention relates to provide a paging method and equipment in a trunking system for a distributed trunking system, so that the paging range is expanded and the paging time delay is shortened. Further, trans-TRN paging is supported, thus paging unavailability due to high moving speed of users when trans-TRN is also solved.

Therefore, the present invention provides a solution as follows:

initiating a request for establishing a call by a calling user equipment UE, lookuping a location area where the called UE is located, and paging the called UE in the location area and a location area adjacent to the location area of the called UE.

In an embodiment of the invention, the location area where the called UE is located is lookuped according to following steps:

a message of establishing request sent by the calling UE is received by a first radio node where the calling UE is located;

when the called UE is also located in the first radio node, the location area where the called UE is located is obtained by the first radio node via information of the called UE which is saved by the first radio node, then a response message to the call establishing is sent to the calling UE;

when the called UE is located in a second radio node, the second radio node where the called UE is located is route lookuped, establishing a link between the first radio node and the second radio node, a request message of call establishing is sent to the second radio node, and the location area where the called UE is located is obtained by the second radio node according to the information of the called UE saved by the second radio node.

In an embodiment of the invention, when the called UE is located in the first radio node, the called UE is paged according to the following steps:

when a location area adjacent to the location area where the called UE is located belongs to other radio node, the first radio node sends the information of the adjacent location area and the request message of call establishing to the corresponding radio node;

the called UE is paged by the first radio node in the location area where the called UE is located and the adjacent location area belonging to the node, the other radio node pages the called UE in the corresponding location area.

In an embodiment of the invention, further comprising:

the called UE sends paging response message to the current radio node where it is located at the current location, and establishes mobile management connection and wireless resource management connection with the radio node.

In an embodiment of the invention, further comprising: when the current radio node is the first radio node, the calling UE and the called UE establish communication with each other; when the current radio node is not the first radio node, the current radio node sends the paging response message to the first radio node, the first radio node establishes a link with the current radio node, the calling UE and the called UE establish communication with each other.

In an embodiment of the invention, when the called UE is located in the second radio node, the called UE is paged according to the following steps:

when the location area adjacent to the location area where the called UE is located belongs to other radio node, the second radio node sends the information of the adjacent location area and the request message of call establishing to the corresponding radio node;

the called UE is paged by the second radio node in the location area where the called UE is located and the adjacent location area belonging to the node, the other radio node pages the called UE in the corresponding location area.

In an embodiment of the invention, further comprising:

the called UE sends paging response message to the current radio node where it is located at the current location, and establishes mobile management connection and wireless resource management connection with the radio node.

In an embodiment of the invention, further comprising: when the current radio node is the second radio node, the calling UE and the called UE establish communication with each other; otherwise, when the current radio node is not the first radio node, the link between the first radio node and the second radio node is released, and the paging establishing of the calling UE is finished;

when the current radio node is other node, the second radio node sends the information of the current radio node to the first radio node, and releases the link between the first radio node and the second radio node;

the first radio node sends the paging establish request message to the current radio node, and the calling establish of the calling UE is finished after the paging establish request message sent by the current radio node is received.

Based on the above method, a paging equipment in a trunking system is provided, comprising:

a query unit for lookuping a location area where a called UE is located based on a paging establish request initiated by a calling user equipment UE; and a paging unit for paging the called UE in the location area and location areas adjacent to the location.

In an embodiment of the invention, the query unit comprises:

a receiving unit for receiving a paging establish request message sent by the calling UE;

a determining unit for determining whether the calling UE and the called UE are located in the first radio node;

a same node query unit for sending the paging establish response message to the calling UE based on location area of the called UE obtained from the information of the called UE saved by the first radio node when the calling and the called UEs are in the first radio node;

a different node query unit for route querying the second radio node where the called UE is located, establishing a link between the first radio node and the second radio node, sending page establish request message to the second radio node and obtaining the location area where the called UE is located by the information of the called UE saved by the second radio node when the calling UE is located in the first radio node and the called UE is located in the second radio node.

In an embodiment of the invention, the paging unit comprises:

a location area determining unit for determining whether the adjacent location area to the location area where the called UE is located belongs to other radio node;

a notifying unit for sending the information of the adjacent location area and the page establish request message to other radio node when the adjacent location area to the location area where the called UE is located belongs to other radio node.

a UE paging unit for paging the called UE in the location area where the called UE is located and in the location areas adjacent to the location area where the called UE is located belonging to the node of the called UE, and notifying said other radio node to paging the called UE in corresponding location area.

In the present invention, when the calling UE initiates a calling request, after the location area where the called UE is located is lookuped at the network side, the called UE is paged in its location area and location areas adjacent to its location area. It can be seen the probability of paging the called UE at a time from the network side is increased greatly regardless of the case whether the called UE can timely report its current location information or whether the network side can obtain the current location of the called UE when the called UE moves among the location areas. Further, the time delay is shortened accordingly.

BRIEF DESCRIPTION OF DRAWINGS

The present invention is described but not limited in conjunction with the embodiments shown in the drawings throughout which the similar reference signs represent the similar elements, in which.

DETAILED DESCRIPTION OF PREFERRED EMBODIMENTS

In the present invention, when the calling UE initiates a paging request, after the network side has lookuped the location area where the called UE is located, the called UE is paged in its location area and location areas adjacent to its location area, thus extending the paging range and shortening the paging time delay.

When UE1 calls UE2, the UE1 is the calling UE, UE2 is the called UE at this time. It is assumed that UE1 is located in the location area A1 belonging to TRN1, and UE2 is located in a location area B1 belonging to TRN2, the locations B2, B3 is the neighboring location area of B1.

Figure 1:
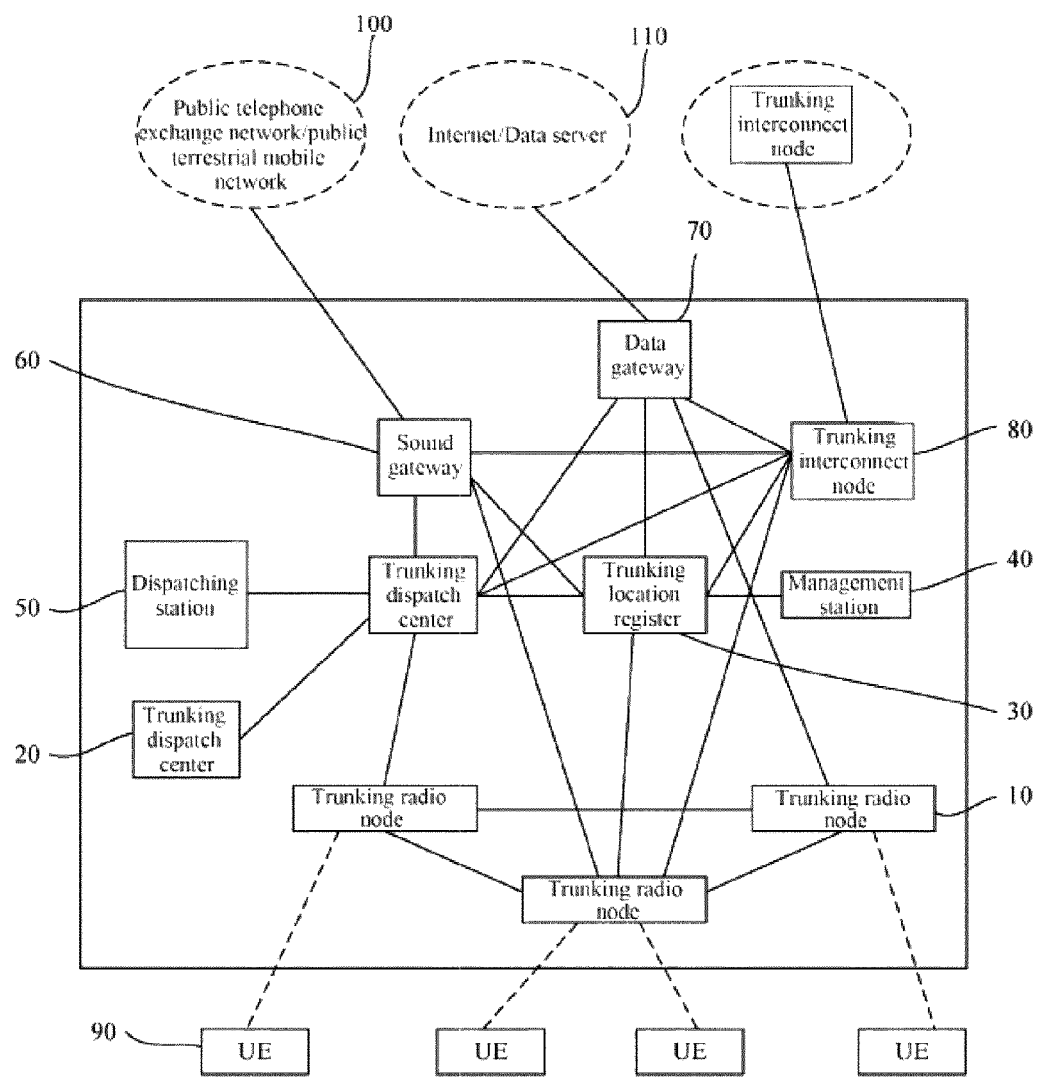
FIG. 1 shows a network schematic view of a distributed trunking system.
Figure 2:
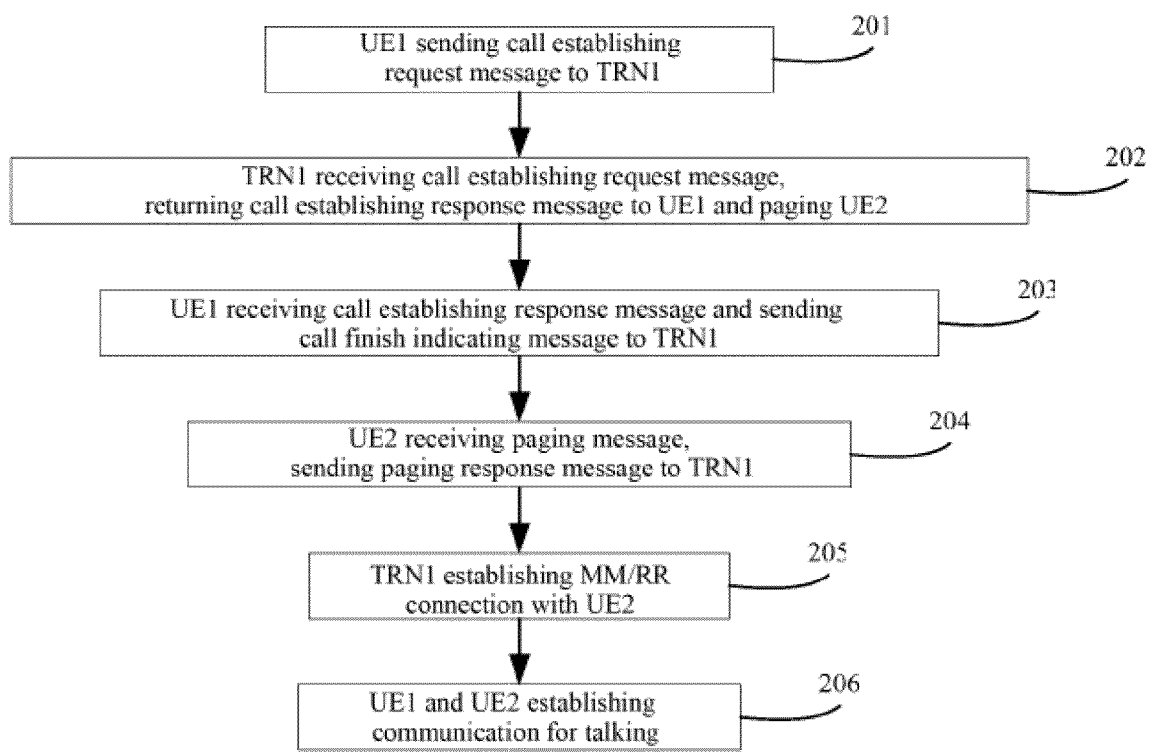
FIG. 2 shows a flow chart according to a first embodiment of the method of the invention.

In embodiment 1, when the UE 1 and UE 2 locate in the same TRN, i.e., the TRN1 and TRN2 are the same TRN, the flow chart of UE1 calling the UE2 is shown in FIG. 2.

In step 201, the UE1 sends a page establish request message to the TRN1, i.e., the calling UE initiates paging to the network side.

In step 202, after the TRN1 receives the page establish request message, the number of the called UE i.e., UE 2 is obtained, if the UE2 belongs to the same TRN, the TRN1 sends a page establishing response message to the UE1, and pages the UE2 in the location area B1 and location areas B2, B3 adjacent to the location areas B1.

In step 203, after UE1 receives the page establishing response message, a call finish instruction message is sent to the TRN 1.

In step 204, UE 2 receives the paging message and sends the paging response message to the TRN 1.

In step 205, the TRN1 and UE 2 establish MM and RR connections.

In step 206, the UE1 establishes communication with the UE 2 to talk.

In the first embodiment, the location areas B1, B2 and B3 belong to TRN1, when UE 2 moves in the three location areas, the TRN 1 can directly page the UE2 in the three location area regardless whether the UE 2 can timely reports its current location.

If the location area B3 belongs to TRN3 rather than TRN1, the TRN1 can not directly page UE2 in the location area B3. At this time, the TRN1 needs to send a page establish request message and the information of the location area B3 to the TRN 3, and TRN 3 pages UE 2 in the location area B3.

If paging is initiated at the network side, the UE 2 moves to the location area B3, then TRN 3 receives the paging response message of the UE 2, establishes Mobility Management (MM) connection and Radio Resource Management (RR) connection with the UE2, and sends the paging response message to TRN1. At this time, the TRN 1 and TRN 3 will establish a link, the UE1 and UE 2 establish communication for talking.

From the first embodiment it can be understood, when the UE 2, i.e., the called UE, moves among location areas, the network side can page the UE at a time with much higher probability and shorter time delay by the automatic expanding of page range from the network side, whether the called UE timely reports its current location information or the network side knows the current location of the called UE.

Figure 3:
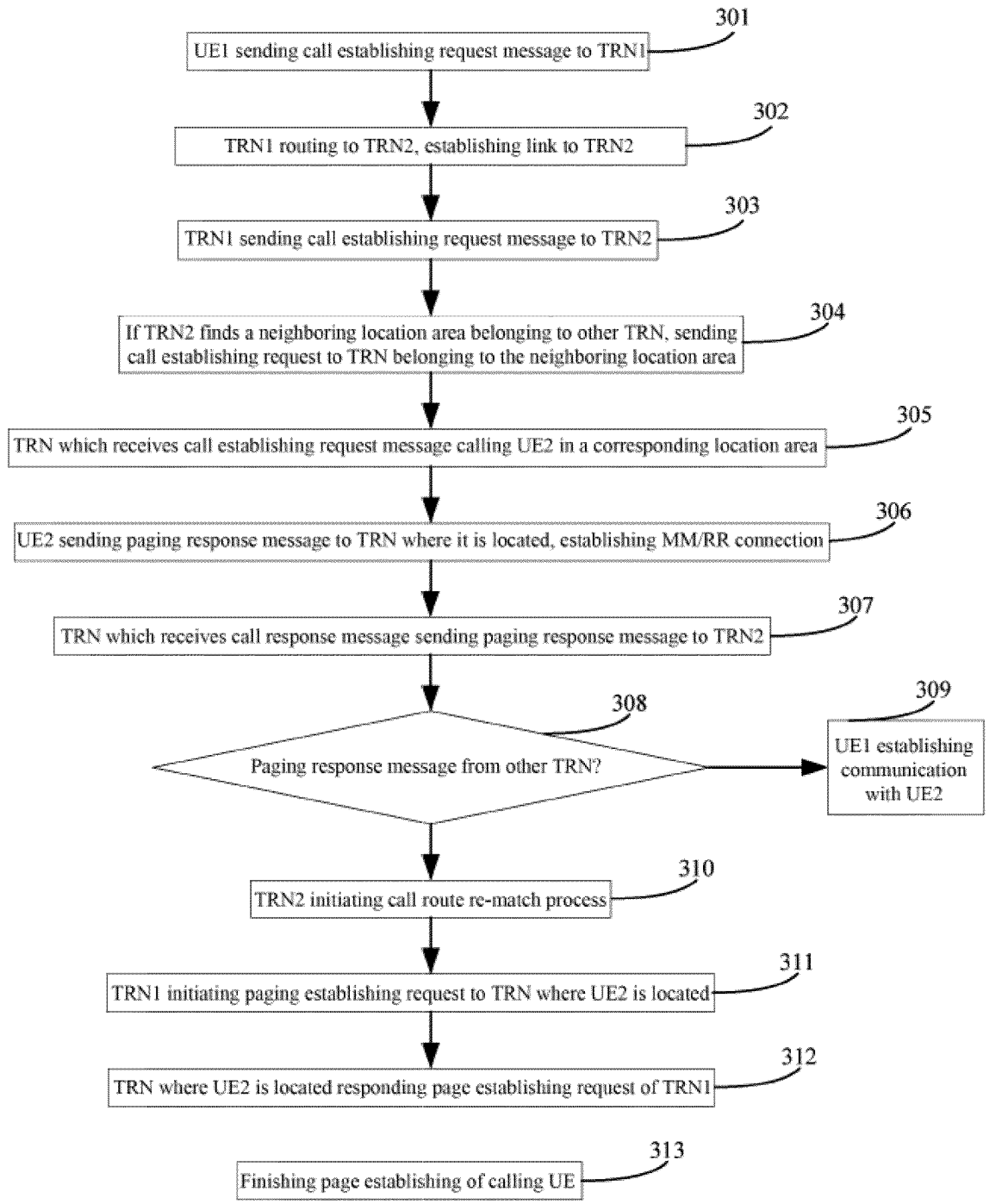
FIG. 3 shows a flow chart according to a second embodiment of the method of the invention.

In a second embodiment, when UE 1 and UE 2 locate in the different TRN, i.e., the TRN1 and TRN 2 are different TRN, the flow chart for UE 1 calling UE 2 is shown in FIG. 3.

In step 301, the UE1 sends the call establishing request message to the TRN 1, i.e., the calling UE initiates calling to the network side.

In step 302, route query process: the TRN 1 lookups that the UE 2 is located in TRN 2, and establishes a link with the TRN 2.

In step 303, the TRN 1 sends a call establishing request message to the TRN2.

In step 304, after the TRN 2 receives the call establishing request message sent by the TRN 1, if a adjacent location area belonging to other TRNs exist, the call establishing request message has also to be sent to the TRN where the adjacent location area belongs.

For example, if the TRN 2 finds that the location area B3 adjacent to the location area B1 belongs to TRN3, the call establishing request message and the information of the location area B3 have to be further sent to the TRN 3.

In step 305, the TRN receiving the call establishing request message pages the UE2 at the corresponding location area.

If the location areas B1, B2, B3 all belong to TRN 2, the TRN2 pages UE2 at the location areas B1, B2 and B3. If the location areas B1, B2 belong to TRN2, the location area B3 belongs to TRN 3, then the TRN 3 receives the call establishing request message sent by TRN2 and the information of the location area B3. At this time, not only the TRN 2 pages UE 2 at the location areas B1 and B2, but the TRN 3 pages the UE 2 at the location area B3.

In step 306, the UE 2 receives the paging message, and sends page response message to the TRN where it is located, establishing MM and RR connections with the TRN where it is currently located.

If UE 2 receives the paging message at the location area over which the TRN2 rules, the paging response message is sent to the TRN2 and establishes MM and RR connections with the TRN 2. If UE2 receives the paging message at the location area over which the TRN3 rules, the paging response message is sent to the TRN3 and establishes MM and RR connections with the TRN3.

In step 307, the TRN receiving the paging response message sends the paging response message to the TRN2.

Assuming the TRN3 receives the paging response message sent by the UE2, the TRN3 sends the message to the TRN2, so that the TRN2 obtains the TRN3 where the UE2 is located.

In step 308, the TRN2 determines whether the paging response message comes from other TRN or not.

If it is yes, the TRN2 initiates a call routing re-configure process, the address of the TRN where the UE2 is currently located is sent to the TRN1, and the link between the TRN1 and TRN2 is released, and the step 311 is executed.

Otherwise, in step 309, the UE1 and UE2 establish communication for talking.

In step 311, the TRN1 initiates the paging establish request to the TRN where the UE2 is really located.

Assuming the TRN where the UE2 is really located is TRN3, the paging response message sent to the TRN3 by the UE2 will be sent to the TRN2 by the TRN3, and the TRN2 initiates the paging route re-configure process, sending the address of the TRN3 to the TRN1, the link between the TRN1 and the TRN2 is released. Then, the TRN1 sends the calling establish request to the TRN3.

In step 312, the TRN where the UE2 is currently located responses to the calling establish request of the TRN1.

In step 313, the TRN1 sends the page establishing response message to the UE1, the UE1 returns the page finishing indication message to the TRN1 so that the establishing of the paging of the calling UE is finished.

It can be seen that, in the second embodiment, although the calling UE and the called UE are not located at the same TRN, the principle of the network side paging the called UE is identical to the first embodiment, i.e., automatically extending the paging range, so that the probability of paging the UE at a time from the network side is increased greatly, thus shortening the paging time delay.

Figure 4:
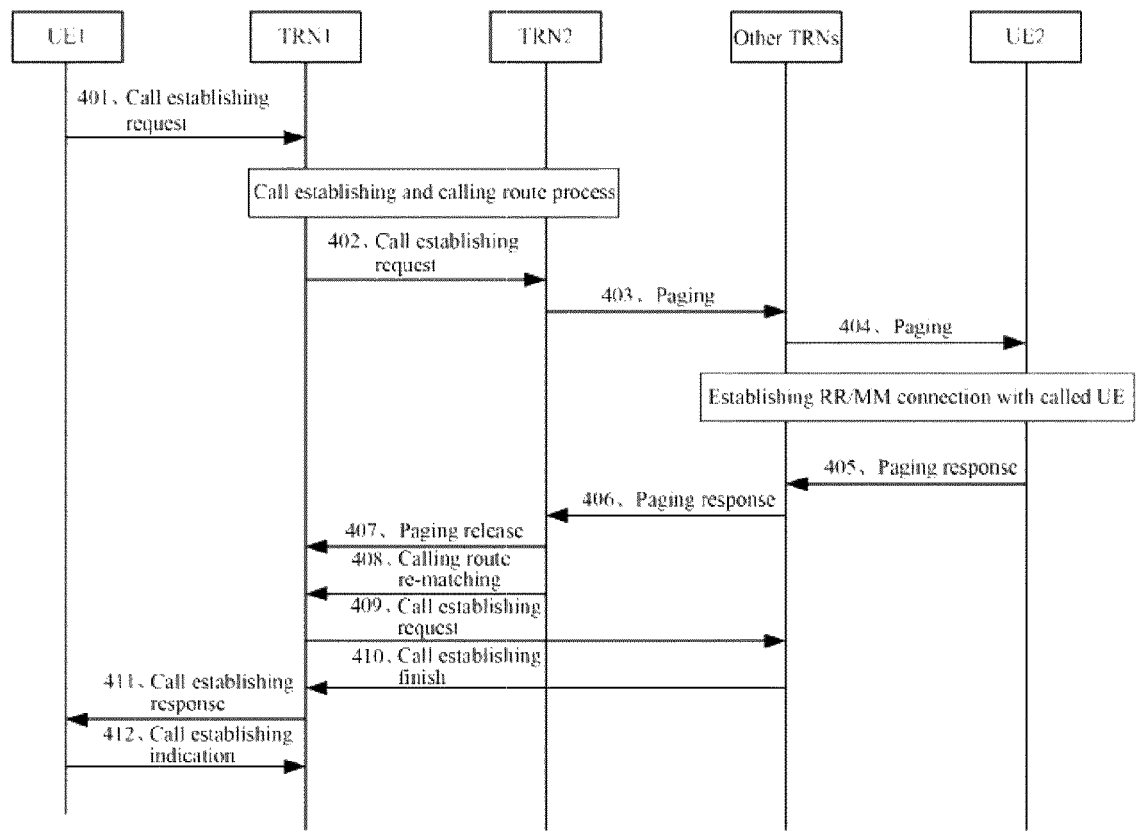
FIG. 4 shows a signal flow chart according to a second embodiment of the method of the invention.

In the second embodiment, when location area adjacent to the location area B1 where the UE 2 is located belongs to other TRN and the UE2 moves to the adjacent location area without timely reporting its current location, the FIG. 4 shows the signal flow chart under this circumstance.

Figure 5:
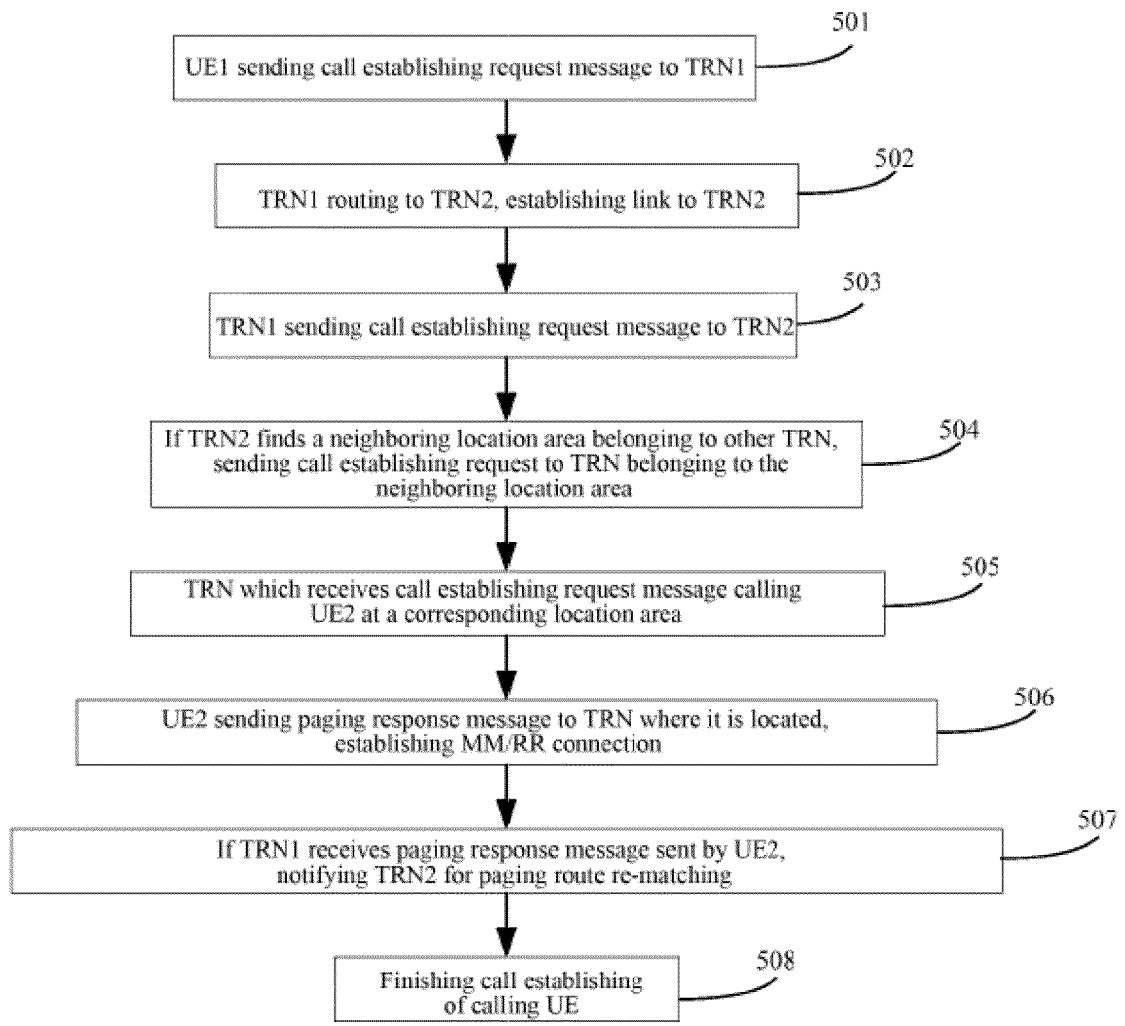
FIG. 5 shows a flow chart according to a third embodiment of the method of the invention.

In a third embodiment, if UE1 and UE2 locate in the different TRN whereas the UE2 moves into the TRN where the UE1 is located, i.e. TRN1, initiating the paging, the flow chart of the UE1 calling the UE2 is shown in FIG. 5.

In step 501, the UE1 sends paging establish request message to the TRN1, i.e., the calling UE initiates paging to the network side.

In step 502, the routing lookup process, TRN1 lookups that UE 2 is located in the TRN2 and establishes a link with the TRN2.

In step 503, the TRN1 sends the paging establish request message to the TRN2.

In step 504, after the TRN2 receives the paging establish request message sent by the TRN1, if it is found that there exists adjacent location area belonging to other TRN, the paging establish request message will be sent to the TRN where the adjacent location area belongs.

For example, if the TRN2 finds that the location area B3 adjacent to the location area B1 belongs to the TRN1, the paging establish request message and the information of the location area B3 have to be sent to the TRN1.

In step 505, the TRN receiving the paging establish request message pages the UE2 at the corresponding location area.

If the location areas B1, B2, B3 all belong to the TRN2, the UE2 is paged by the TRN2 at the location areas B1, B2, B3. If the location areas B1, B2 belong to the TRN2 and the location area B3 belongs to the TRN1, the TRN1 receives the paging establish request message sent by the TRN2 and the information of the location area B3. At this time, not only the UE2 is paged by the TRN2 at the location areas B1, B2, but also the TRN1 pages the UE2 at the location area B3.

In step 506, the UE2 receives the paging message, sends paging response message to the TRN where it is currently located, and establishes MM and RR connections with the corresponding TRN.

If the UE2 receives the paging message in the location area ruled by the TRN2, the UE2 sends the paging response message to the TRN2, and establishes MM and RR connections with the corresponding TRN.

In step 507, if the TRN1 receives the paging response message sent by the UE2, the TRN2 is notified for page route reconfiguring.

After the TRN2 receives the route reconfiguring notification sent by the TRN1, the link between the TRN2 and TRN1 is released.

In step 508, TRN1 sends the paging establish response message to the UE1, the UE1 sends the paging finish indication message to the TRN1, so that the paging establishing of the calling UE is finished.

Figure 6:
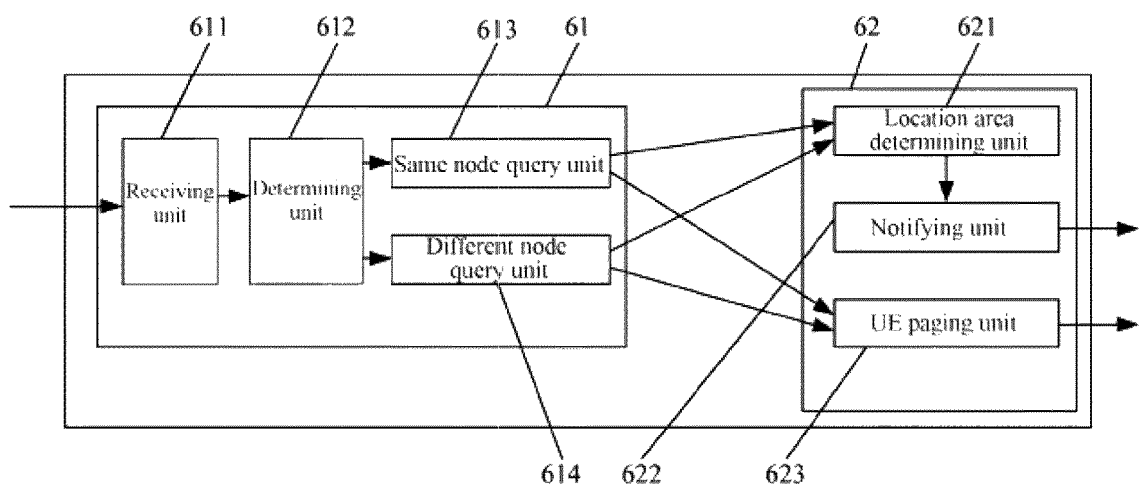
FIG. 6 shows a schematic view of a equipment of the invention.

Based on the above method, the present invention also provides a paging equipment in a trunking system. FIG. 6 shows a structure of the equipment. The equipment comprises a query unit 61 and a paging unit 62. The query unit 61 comprises a receiving unit 611, a determining unit 612, a same node query unit 613 and a different node query unit 614. The paging unit 62 comprises a location area determining unit 621, a notifying unit 622 and an UE paging unit 623. When the system is running, all the TRNs have the equipment. When the calling UE initiates paging, the equipment achieves the same function based on the TRN where it is located.

When the UE1 calls the UE2, the UE1 is the calling UE, the UE2 is the called UE. It is assumed that the UE1 is located in a location area A1 belonging to the TRN1, the UE2 is located in a location area B1 belonging to the TRN2, and the location areas B2, B3 are the adjacent location areas of the B1.

When the UE1 sends the paging establish request message to the network side, in TRN1, the location area of the called UE, i.e. UE2, is queried by the query unit 61 in the paging equipment based on the paging establish request message initiated by the UE1, and UE2 is paged by the paging unit 62 in the location area where the UE2 is located and in location areas adjacent to the location area of UE2.

When the UE1 sends the paging establish request message to the network side, the equipment receives the paging establish request message sent by the UE1 with the receiving unit 611 at the TRN1, and determines whether the UE1 and UE2 are located in the same radio node with the determining unit 612.

When the UE1 and UE2 locate in the same TRN, i.e., the TRN1 and the TRN2 are the same TRN, at this time, the same node query unit 613 obtains the location area where the UE2 is located, i.e., the location area B1 based on the information of the UE2 saved by the TRN1, and pages the UE2 in the location area where the UE2 is located and the location areas adjacent to the location area of UE2 using the paging unit 62.

When the UE1 sends paging establish request message to the network side, the equipment receives the paging establish request message sent by the UE1 through the receiving unit 611 at the TRN1, and determines whether UE1 and UE2 are located in the same radio node or not using the determining unit 612.

When the UE1 and UE2 are at the same TRN, i.e., the TRN1 and TRN2 are the same TRN, the same node query unit 613 obtains the location area where the UE2 is located, i.e., the location area B1, based on the information of the UE2 saved by the TRN1, and sends the paging establishing response message to the UE1.

Then, the paging equipment determines location areas adjacent to the location area B1, i.e., location areas B2, B3, belong to other TRN through the location area determining unit 621. When the adjacent location areas belong to other location area, assuming the location area B3 is located in the other TRN, the information of the location area B3 and the paging establish request message sent by the UE1 are sent to the TRN where the location area B3 belongs by the notifying unit 622.

Finally, the paging equipment calls the UE2 in the location area B1 and the adjoining location area B2 by an UE paging unit 623, notifying the TRN where the location area B3 belongs to page the UE2 at the location area B3.

When the UE1 and UE2 are not located in the same TRN, i.e., the TRN1 and the TRN2 are not the same TRN, at this time, the different node query unit 614 routing lookups the TRN2 where the UE 2 is located, establishes a link between the TRN1 and the TRN2, sends the paging establish request message to the TRN2, and the TRN2 obtains the location area where the UE2 is located, i.e., location area B1, based on the information of the UE2 saved by the TRN2.

In the TRN2, the paging equipment determines whether the adjacent location areas, i.e., location areas B2, B3, to the location area B1 belong to other TRN by the location area determining unit 621. When there is adjacent location area that belongs to other TRN, assuming the location area B3 belonging to other TRN, the information of the location area B3 and the paging establish request message sent by the UE1 are sent to the TRN where the location area B3 belongs by the notifying unit 622.

Then, the paging equipment pages the UE2 in the location area B1 and the adjacent location area B2 through the UE paging unit 623, notifying the TRN where the location area B3 belongs to page the UE2 at the location area B3.

It can be seen that, because of the automatic expanding paging range of the network side, the probability of paging the called UE at a time from the network side is increased greatly regardless of the case whether the called UE can timely report its current location information or whether the network side can obtain the current location of the called UE when the called UE moves among the location areas.

It is obvious for a person normally skilled in the art that the illustrative method steps and equipment units disclosed in the embodiments can be achieved using electronic hardware, software or the combination thereof. For clearly indicating the exchangeability between the hardware and the software, the illustrative steps and units are described generally in its functional form. The embodiment of the function in hardware or software depends on specific application and the design constraint of the whole system. A person normally skilled in the art can achieve the functionality in multiple forms for each specific application. However, the achievements thereof should not be construed as limiting the scope of the invention.

Using a general processor, DSP, ASIC, FPGA or other programmable logic equipments, discrete gate or transistor logic, discrete hardware component or combination thereof, exemplary units in the described embodiments disclosed herein can be achieved or executed. The general processors may be a micro-processor. In another situation, the processor can be any traditional processor, controller, micro-controller or state machine. The processor can be implemented as combination of computing equipments, such as the combination of DSP and the microprocessor, a plurality of micro-processors, one or more micro-processors having DSP core or any other structure similar thereto.

The steps of the method in combination with the embodiments disclosed herein can be embodied directly in hardware, software module executed by processors or the combination thereof. The software module can reside in RAM memory, flash memory, ROM memory, EPROM memory, EEPROM memory, registers, hardware, mobile disk, CD-ROM or any other form of storage medium known in the art. An exemplary storage medium is coupled with the processor so that the processor can read information out of the storage medium and can write information into the storage medium. In an alternative embodiment, the storage medium is an integral part of the processor. The processor and the storage medium can exist in an ASIC. The ASIC can exist in a subscriber station. In an alternative embodiment, the processor and the storage medium can exist as discrete modules of the subscriber station.

Although the present invention is described in conjunction with the examples and embodiments, the present invention is not intended to be limited thereto. On the contrary, the present invention obviously covers the various modifications and may equivalences, which are all enclosed in the scope of the following claims.

What is claimed is:

1. A method for paging in a trunking system, comprising:
    initiating a request for establishing a call by a calling user equipment UE,
    lookuping a location area where a called UE is located, and paging the called UE in the location area and a location area adjacent to the location area of called UE at one time,
    wherein lookuping the location area where the called UE is located according to following steps:
    receiving a message of establishing request from the calling UE by a first radio node where the calling UE is located;
    obtaining the location area where the called UE is located by the first radio node via information of the called UE which is saved by the first radio node when the called UE is also located in the first radio node, then sending a response message to the call establishing to the calling UE;
    when the called UE is located in a second radio node, routing lookuping the second radio node where the called UE is located, establishing a link between the first radio node and the second radio node, sending a request message of call establishing to the second radio node, and obtaining the location area where the called UE is located by the second radio node according to the information of the called UE saved by the second radio node,
    when the called UE is located in the second radio node, further comprising:
    establishing communication between the calling UE and the called UE when the current radio node is the second radio node; otherwise,
    releasing the link between the first radio node and the second radio node when the current radio node is not the first radio node, and finishing the paging establishing of the calling UE;
    when the current radio node is other node, sending the information of the current radio node from the second radio node to the first radio node, and releasing the link between the first radio node and the second radio node;
    sending the paging establish request message from the first radio node to the current radio node, and finishing the calling establish of the calling UE after the paging establish request message sent by the current radio node is received.

2. The method according to claim 1, wherein when the called UE is located in the first radio node, paging the called UE according to the following steps:
    when a location area adjacent to the location area where the called UE is located belongs to other radio node, sending the information of the adjacent location area and the request message of call establishing from the first radio node to the corresponding radio node;
    paging the called UE by the first radio node in the location area where the called UE is located and in the adjacent location area belonging to the node, paging the called UE by the other radio node in the corresponding location area.

3. The method according to claim 2, further comprising:
    sending paging response message from the called UE to the current radio node where it is located at the current location, and establishing mobile management connection and wireless resource management connection between the radio node and the called UE.

4. The method according to claim 3, further comprising:
    establishing communication connection between the calling UE and the called UE when the current radio node is the first radio node;
    sending the paging response message from the current radio node to the first radio node when the current radio node is not the first radio node, establishing a link between the first radio node and the current radio node, establishing communication between the calling UE and the called UE.

5. The method according to claim 1, when the called UE is located in the second radio node, paging the called UE according to the following steps:
    when the adjacent location area to the location area where the called UE is located belongs to other radio node, sending the information of the adjacent location area and the request message of call establishing from the second radio node to the corresponding radio node;

paging the called UE by the second radio node in the location area where the called UE is located and the adjacent location area belonging to the node, and paging the called UE by the other radio node in the corresponding location area.

6. The method according to claim 5, further comprising:

sending paging response message from the called UE to the current radio node where it is located at the current location, and establishing mobile management connection and wireless resource management connection between the called UE and the radio node.

7. A paging equipment in a trunking system, comprising:

a query unit for lookuping a location area where a called UE is located based on a paging establish request initiated by a calling user equipment UE; and a paging unit for paging the called UE in the location area and an adjacent location area to the location area at one time, wherein the paging unit comprises a location area determining unit for determining whether the location area adjacent to the location area of the called UE belongs to other radio node;

a location area determining unit for determining whether the location area adjacent to the location area of the called UE belongs to other radio node;

a notifying unit for sending the information of the adjacent location area and the page establish request message to other radio node when the adjacent location area to the location area of the called UE belongs to other radio node;

a UE paging unit for paging the called UE in the location area where the called UE is located and in the location areas adjacent to the location area of the called UE belonging to the node of the called UE, and notifying said other radio node to paging the called UE in corresponding location area.

8. The equipment according to claim 7, wherein the query unit comprising:

a receiving unit for receiving a paging establish request message sent by the calling UE;

a determining unit for determining whether the calling UE and the called UE are located in a first radio node;

an same node query unit for sending the paging establish response message to the calling UE based on location area of the called UE obtained from the information of the called UE saved by the first radio node when the calling and the called UEs are in the first radio node;

a different node query unit for route querying a second radio node where the called UE is located, establishing a link between the first radio node and the second radio node, sending page establish request message to the second radio node and obtaining the location area where the called UE is located by the information of the called UE saved by the second radio node when the calling UE is located in the first radio node and the called UE is located in the second radio node.

* * * * *